W. F. CARLTON.
PNEUMATIC DRIER AND CONVEYER.
APPLICATION FILED OCT. 31, 1907.
899,658.
Patented Sept. 29, 1908.
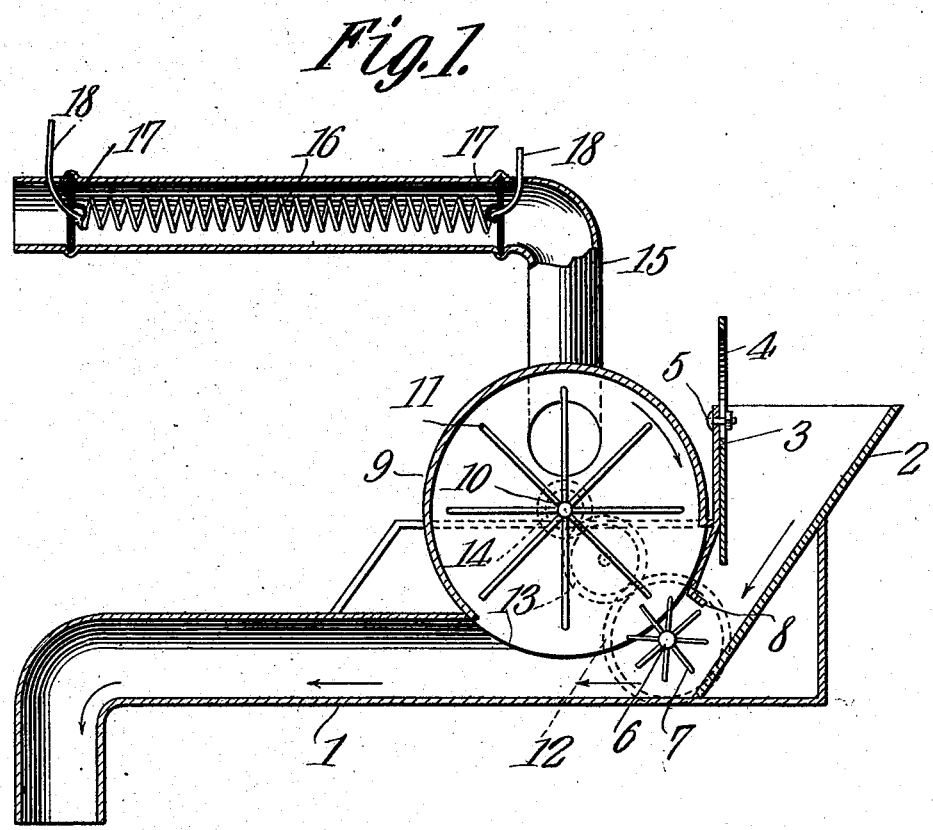
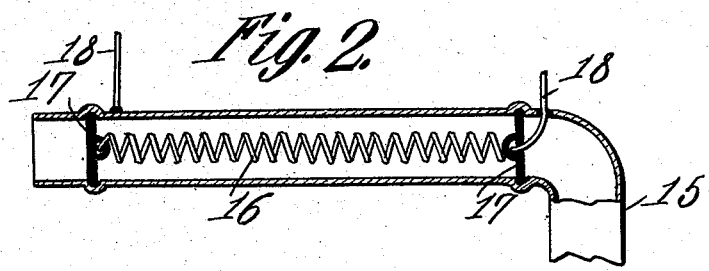
Inventor
William F. Carlton.

UNITED STATES PATENT OFFICE.

WILLIAM F. CARLTON, OF ADVANCE, MISSOURI.

PNEUMATIC DRIER AND CONVEYER.

No. 899,658.

Specification of Letters Patent.

Patented Sept. 29, 1908.

Application filed October 31, 1907. Serial No. 400,090.

*To all whom it may concern:*

Be it known that I, WILLIAM F. CARLTON, a citizen of the United States, residing at Advance, in the county of Stoddard and State of Missouri, have invented a new and useful Pneumatic Drier and Conveyer, of which the following is a specification.

This invention has reference to improvements in pneumatic driers and conveyers, and is designed to convey grain through a suitable conduit by an air blast continuously generated in the conveyer or conduit, and to so treat the air, by subjecting it to the effect of an electric current, that the air is rendered moisture absorbent to a greater degree than normal, and so the device may be used without deleterious effects upon the grain, even in damp localities.

The invention comprises, essentially, a conveyer into which the grain is fed from a suitable hopper by means of revolving blades, and is immediately subjected to an air blast from a fan so located as to impel the air through the conveyer or conduit from a point immediately adjacent to the hopper, while the induction pipe to the blower has disposed in it an electric conductor connected to a suitable source of current, so that the air flowing through the air pipe is not only heated by the rise in temperature in the conductor, but may also be otherwise affected by the current flowing through the conductor depending upon the character of the current employed.

The invention will be best understood from the following detail description, taken in connection with the accompanying drawings forming part of this specification, in which, Figure 1 is a longitudinal section, partially diagrammatic, of a conveyer constructed in accordance with my present invention. Fig. 2 is a view illustrating the electrical connections when high tension currents are used.

Referring to the drawing, there is shown a conveyer 1 in the form of a tube of suitable length having one end connected to a hopper 2, which hopper is provided with an adjustable gate 3 by means of which the flow of grain or other material from the hopper to the conveyer or conduit may be regulated at will. This gate is provided with a longitudinal slot 4 in which engages a bolt 5 by means of which the gate may be secured in any adjusted position. At the mouth of the hopper, where it delivers into the conduit, a shaft 6 extends laterally across the conduit and is provided with a series of radial blades 7 which, when the shaft 6 is rotated in the proper direction, serve to propel the contents of the hopper into the conduit 1 and along the same for a short distance. The discharge end of the hopper is provided with an inwardly directed lip 8 constricting the mouth of the hopper, so that the grain entering the conduit will not lie therein at a greater depth than the height of the shaft 6 from the bottom of the conduit.

Adjacent to the hopper 2 is a cylindrical casing 9 constituting the casing of the blower, which casing opens at the bottom into the top of the conduit 1 just in advance of the feeding blades 7. Mounted in the axis of the casing 9 is a shaft 10 upon which is mounted a circular series of blower blades 11. Exterior to the structure, the shafts 6 and 10 are connected by gear wheels 12, 13 and 14, so that feeder blades 7 and the fan blades 11 may have the same sense of rotation. Power is applied at any suitable point for rotating the feeder and fan. Entering the casing 9 is an air induction pipe 15 made sufficiently long to contain a coil 16 of wire constituting an electric conductor mounted on insulating supports 17 in the pipe. The terminals 18 of the conductor are carried out through insulating bushings in the pipe and are there connected to the terminals of a suitable electric circuit coming from a source of electric energy, but neither such electric circuit or source of energy are shown in the drawing.

Let it be assumed that grain is supplied to the hopper 2 and the gate 3 is properly adjusted, and the parts have been set in motion. The grain gravitates to the feed blades 7 and is carried thereby into the conduit 1 under the blower blades 11. By this means, as soon as the grain leaves the feeder, it is met by an air blast which drives it on the rest of the way to the conduit. Under some circumstances, this air blast is sufficient to dry the grain as well as to force it through the conduit, but when the air is damp, either from weather conditions or from the location of the device in a damp locality, or from other causes, then when an electric current is passed through the conductor 16 the temperature is raised and the heat so generated is communicated to the air as it passes through the air pipe 15, so that the air becomes operatively dry, thus not affecting the grain through which it is blown. Furthermore, under the operation of an alternating current, the air becomes acted upon by the current flowing through the conductor 16, and this is found to have a beneficial effect upon the grain, especially on passing a high tension current through the conductor 16, or as shown in Fig. 2 by constituting the conductor 16 one terminal of a high tension circuit with the pipe 15 constituting the other terminal, so that there is produced a brush or spark discharge from the conductor to the pipe, or from the pipe to the conductor, thus ozonizing the air.

I claim:—

1. A pneumatic conveyer comprising a suitable conduit, a feed hopper at one end thereof, feeding blades adjacent to the hopper and located within the conduit, a blower adjacent to the hopper and feeding blades and directing air into the conduit in a direction away from the hopper, an air inlet pipe for the blower, and an electric conductor housed in said air pipe and adapted to be connected to a suitable source of electric current.

2. A pneumatic conveyer comprising a tubular conduit a hopper leading into one end thereof, a rotary feeder within the conduit adjacent to the delivery end of the hopper, a blower having fan blades entering the conveyer, a casing for the blower constituting a continuation of the conveyer walls, an air inlet pipe for the blower, and an electric conductor housed in said air pipe and adapted to be connected to a suitable source of electric current.

3. A pneumatic conveyer and drier comprising a suitable conduit, a hopper connected to one end thereof, a feeder in the conduit adjacent to the hopper, a blower adjacent to the feeder and opening into the conduit, an air inlet pipe for the blower, and an electric conductor housed in but out of direct electrical contact with said air pipe and adapted to be connected to a suitable source of electric current, the said conductor constituting one terminal of the circuit, and the air pipe constituting the other terminal of the circuit.

In testimony that I claim the foregoing as my own, I have hereto affixed my signature in the presence of two witnesses.

WILLIAM F. CARLTON.

Witnesses:
J. F. NORRIS,
JOHN MATHENY.